(No Model.)
J. S. WHITELEY.
BICYCLE.
No. 562,446. Patented June 23, 1896.
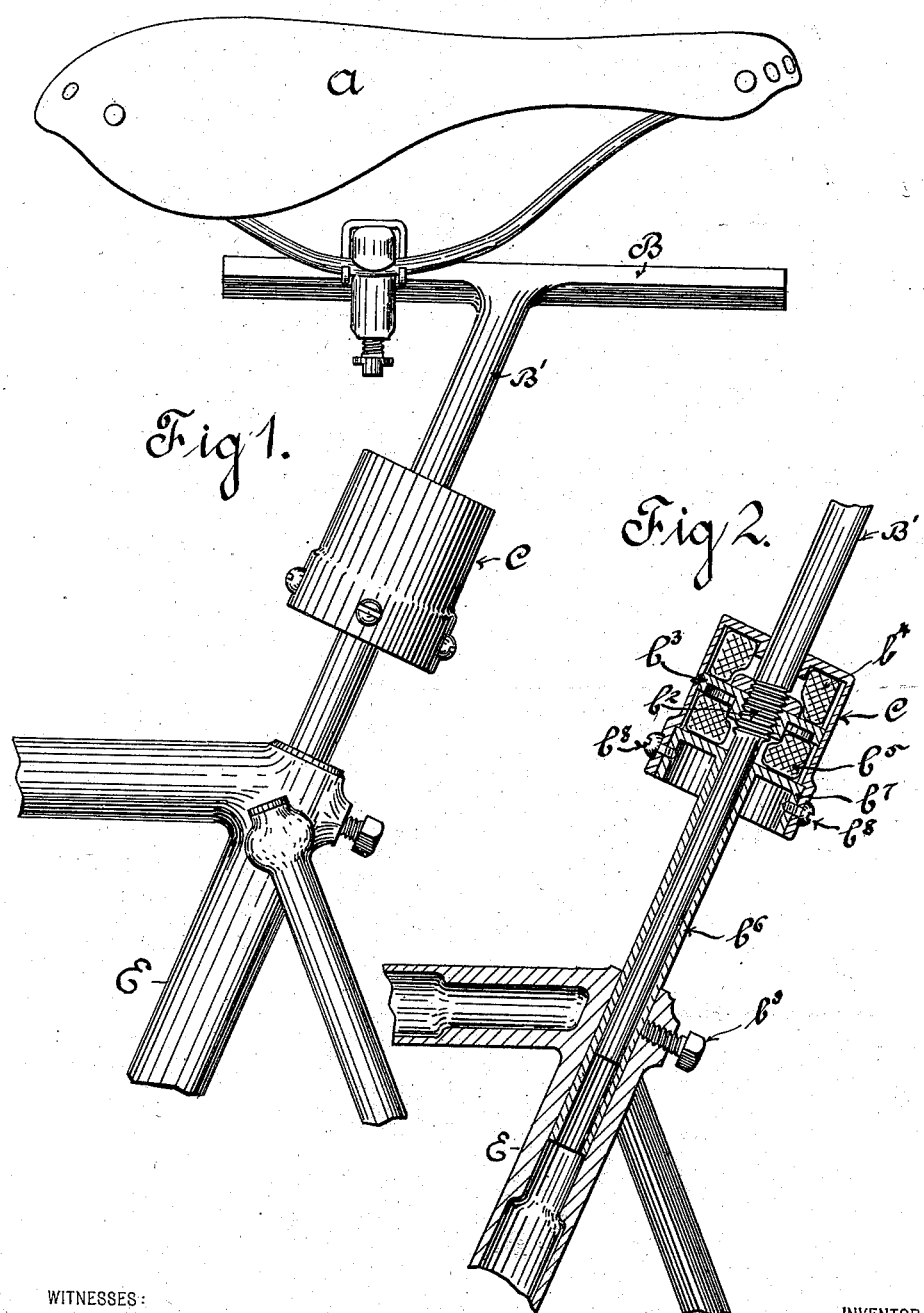
WITNESSES:
INVENTOR
James S. Whiteley
BY
Price & Stuart
ATTORNEYS

UNITED STATES PATENT OFFICE.

JAMES S. WHITELEY, OF BALTIMORE, MARYLAND.

BICYCLE.

SPECIFICATION forming part of Letters Patent No. 562,446, dated June 23, 1896.

Application filed November 22, 1895. Serial No. 569,771. (No model.)

*To all whom it may concern:*

Be it known that I, JAMES S. WHITELEY, of the city of Baltimore, in the State of Maryland, have invented a new and useful Improvement in Bicycles, of which the following is a full description.

My invention applies to devices in connection with the seat or saddle of a bicycle whereby the wheelman may ride with much greater comfort than with those as constructed at present; and it consists chiefly in the addition of a spring-cushion upon the seat-rod.

The drawings illustrate the invention, of which—

Figure 1 is an upright side view of the seat of a bicycle and its usual support. Fig. 2 is a sectional view of the same without the seat and showing the arrangement of spring-cushion interposed between the seat and its supporting-tubes.

The invention as illustrated is shown upon a bicycle in which A is the seat, secured to the longitudinal bar B, supported by the rod B'.

$a^2$ is the ordinary curved spring suitably adjusted upon the bar B and supports the seat $a$.

C is a cylinder of any suitable metal, through which is passed the rod B'. This rod is larger at its upper portion than it is below, and is provided with a screw-thread $b^2$, upon which I place the flange or piston $b^3$. Above the piston I place an india-rubber disk $b^4$, and below, a similar disk $b^5$. A tube $b^6$ surrounds the rod B' and is provided with a head $b^7$, which enters the lower portion of the cylinder C, and is secured to the cylinder by the set-screws $b^8$. This tube passes down through the main tubular supports of the machine E and is secured therein by the set-screw $b^9$, thus providing the means for raising or lowering the saddle. It will be seen by this arrangement that in addition to the ordinary spring, provided in the usual way for the saddles of bicycles, I have provided a cushion on the main supporting-rod for the seat or saddle, whereby greater comfort is obtained and by means of which the wheelman may be able to ride long distances with less fatigue.

What I claim, and desire to secure by Letters Patent, is—

In a bicycle provided with the ordinary seat and its supporting-rod, the combination therewith of a flange on said rod, a cylinder surrounding the flange, spring-cushions within the cylinder, located above and below the flange, and a sliding tube as $b^6$ provided with the head $b^7$ supporting the spring-cushions and surrounding the rod B', substantially as described.

Signed at Baltimore city, in the State of Maryland, this 20th day of November, A. D. 1895.

JAMES S. WHITELEY.

Witnesses:
JOHN L. HEBB,
H. MACCARTHY.